March 6, 1962 N. F. McLEOD 3,024,228
RECOVERY OF POLYMERS FROM SOLUTION
Filed Nov. 6, 1959
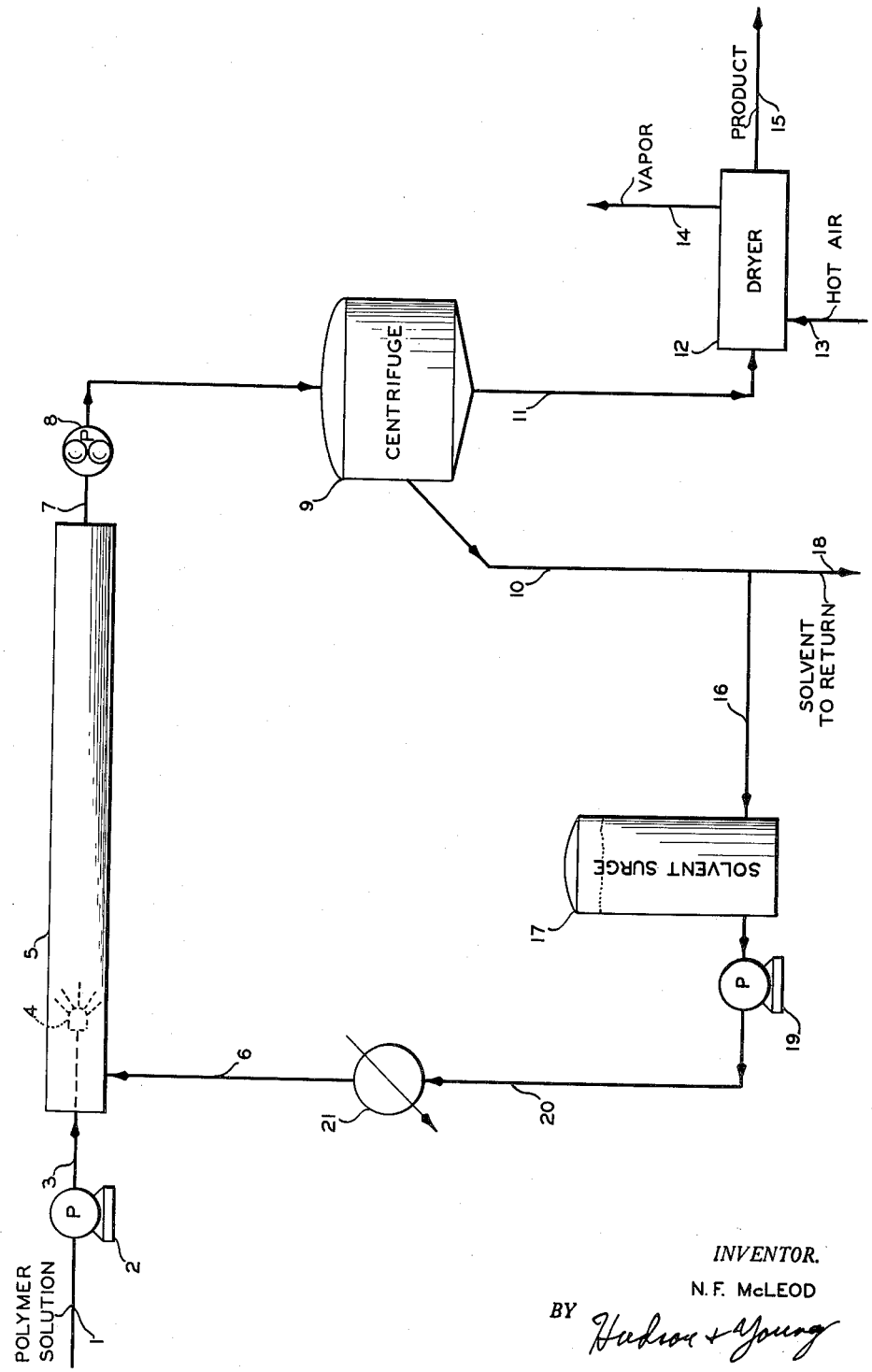
INVENTOR.
N. F. McLEOD
BY *Hudson & Young*
ATTORNEY'S United States Patent Office 3,024,228
Patented Mar. 6, 1962

3,024,228
RECOVERY OF POLYMERS FROM SOLUTION
Norman F. McLeod, Borger, Tex., assignor to Phillips Petroleum Company, a corporation of Delaware
Filed Nov. 6, 1959, Ser. No. 851,938
5 Claims. (Cl. 260—94.9)

This invention relates to a novel process for the recovery of polymers from hydrocarbon solutions thereof.

This application is a continuation-in-part of my copending application Serial Number 590,566, filed June 11, 1956 and now abandoned.

The method of this invention is applicable to recovery of polymers from solutions thereof broadly. This invention has particular application to the recovery of 1-olefin polymers from the solvent used in the polymerization of said 1-olefins. These polymers can be homopolymers or copolymers of one or more 1-olefins.

It has been recently discovered that 1-olefins having a maximum of 8 carbon atoms per molecule and no branching nearer the double bond than the four-position can be polymerized to solid and semi-solid polymers at low temperatures and pressures as compared with conventional processes for polymerizing these olefins. Such polymerization is generally carried out by first admixing and at least partially dissolving the olefins in a nonpolymerizable solvent and carrying out the polymerization in the presence of a catalyst.

In the patent of Hogan et al., Patent Number 2,825,721, issued March 4, 1958, a process is disclosed for producing novel polymers of 1-olefins by carrying out the polymerization at a temperature in the range of 100 to 500° F. in the presence of 0.1 to 10 or more weight percent of chromium as chromium oxide, preferably including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst ordinarily is a highly oxidized catalyst which has been activated by high-temperature treatment under non-reducing conditions and preferably in the presence of an oxidizing gas. Olefins other than 1-olefins as described are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or naphthene which is liquid under the polymerization conditions; however, vapor phase operation or mixed phase operation can be effected. Also, diolefins can be polymerized by the chromium oxide catalyst to produce solid polymers. As has been indicated, this invention is applicable to recovery of polymeric 1-olefins from solution and is particularly applicable to recovery of polymers from the solvent as prepared by the above preferred method. However, polymers as prepared by other catalyst systems can be recovered by the method of this invention, e.g., polymers prepared in the presence of organo-metal catalyst as disclosed by Karl Ziegler in Belgian Patent 533,362, November 16, 1954.

When 1-olefins are polymerized in solvent, the operating conditions are so controlled that the polymer remains in solution. One method of recovering polymers is by flash evaporation generally combined with steam stripping. By the method of this invention, polymer of improved properties is obtained. Such polymers are especially suitable for fabrication and films can be readily prepared which are free from so-called "fish eyes," e.g., non-homogeneous imperfections. Such polymers are also readily filtered and dried.

An object of this invention is to provide an improved process for recovery of 1-olefin polymers from hydrocarbon solutions thereof.

Other objects, advantages and features of this invention will be apparent to those skilled in the art having been given this disclosure.

According to my invention, a hydrocarbon solution of 1-olefin polymer is dispersed in solvent having a temperature of at least 90° F. in a ratio that the resulting dispersion will have a temperature below the precipitation temperature of the polymer.

As previously indicated, the materials to which this invention are particularly applicable are polymers of 1-olefins. Polymers of 1-olefins containing 2 to 8 carbon atoms and having no branching nearer the double bond than the four-position have been found in recent years to have superior heat resistance and low temperature properties when polymerized at relatively low temperatures and pressures. The above-identified method of Hogan et al. is one such low temperature-low pressure method. Also as indicated, it is preferable to carry out the polymerization in a hydrocarbon solvent. This invention is particularly valuable in recovering such polymers from such solvents.

Examples of olefins which are operable in this invention are ethylene, propylene, 1-butene, 1-pentene, 1-hexene, 1-octene, 4-methyl-1-pentene, 4-methyl-1-hexene, 5-methyl-1-heptene, 6-methyl-1-heptene, and the like.

The solvents especially useful in polymerizing the olefins are hydrocarbons and preferably paraffins including cycloparaffins. These solvents or diluents include paraffins and cycloparaffins having 3 to 12 carbon atoms per molecule. Any of the paraffins or cycloparaffins which are a solvent for the polymer at the temperature in the polymerization range are suitable. Any hydrocarbon which is relatively inert, non-deleterious, and a liquid under the operating conditions of the process can be utilized. Solvents that have been used successfully in the polymerization reaction and are operable in this invention include propane, isobutane, normal pentane, isopentane, isoctane (2,2,4-trimethylpentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention since this invention is useful for recovering polymer from solution regardless of the source of the solution. In general, the polymer is completely soluble in these solvents only at elevated temperatures, e.g., at least 200° F. for polyethylene of the type described.

It has been found that the solvent into which the polymer solution is dispersed should have a temperature no lower than 90° F. In general, a diluent temperature of 100° F. and preferably 110° F. is used. It has also been found that a mix temperature, i.e., solution and diluent, should not exceed 170° F. The minimum mix temperature is dependent upon the temperature of the solvent, the temperature of the solution and the ratio of solvent to solution. In order to minimize the amount of solvent to be handled, the mix temperature is generally held to a temperature within the range of 130 to 170° F. The diluent solvent preferably is the same as that of the solution, but a different diluent solvent can be used, if desired; however, this normally requires a solvent separation step to recover the solvent. However, when polymerizing with mixed solvents, then mixed solvents can be used as the diluent solvent.

In the preferred operation of this invention, a polymer solution having a temperature in the range of 200 to 400°

F. and a concentration in the range of 2 to 8 percent polymer is dispersed by means of a nozzle such as a spray nozzle or preferably an atomizing nozzle into 1 to 5 volumes of solvent having a temperature below the precipitation temperature of the polymer but above 90° F. so as to obtain a resulting dispersion temperature within the range of 130 to 170° F. and under conditions of pressure to maintain the solvent substantially in the liquid state. However, it should be understood that this invention is applicable to other concentrations both higher and lower and is operable with other diluent to solution ratios. Also, lower dispersion temperatures are operable, however, the amount of solvent required makes such lower temperatures impractical.

It has been found, however, when the diluent temperature is below about 90° F. that a large amount of polymer is precipitated having physical properties such that the polymer cannot be readily filtered or dried. This is true regardless of the final dispersion temperature and when the final dispersion temperature is higher than about 170° F., the polymer is stringy regardless of the diluent temperature. However, when operating within the temperature limits as stated, the polymer is precipitated as fine granules which are readily filtered and dried.

I have found this invention especially useful in recovering polymers of 1-olefins prepared in hydrocarbon solutions at low temperatures such as by the method of Hogan et al., Ziegler or processes other than Ziegler utilizing an organo metal catalyst. However, as previously indicated, the method of this invention is useful in recovering polymers from hydrocarbon solutions regardless of the solution source. Polyethylene as prepared by Hogan et al. is of particular value commercially and cyclohexane is frequently employed as the polymerization solvent. For these reasons, I will describe my invention wherein polyethylene is recovered from solution in cyclohexane. I will also describe my invention in conjunction with the drawing forming a part of this specification and which is:

A schematic flow diagram of the process of this invention.

Referring now to the drawing, a polymer solution in cyclohexane at 276° F. and a concentration of 3.11 percent polymer passes at a rate of 1.2 gallons per minute via conduit 1 to pump 2 from whence it is pumped via conduit 3 to nozzle 4 in mixing zone 5. The pressure in conduit 3 is 110 p.s.i.g. and the pressure in mixing zone 5 is 80 p.s.i.g. Diluent cyclohexane at 95° F. and a pressure of 90 p.s.i.g. is passed to mixing zone 5 via conduit 6 at 1.30 gallons/minute. The solution is sprayed into the solvent via nozzle 4 and the resulting dispersion temperature is 145° F. and the solid polymer concentration is 1.31 percent. The dispersion then passes via conduit 7 and pump 8 to centrifuge 9 wherein the major portion of the solvent is separated from wet centrifuge cake and solvent is removed via conduit 10. The wet cake is removed via conduit 11 and passed to a drier 12. Hot air enters drier 12 via conduit 13 and vapors, air plus cyclohexane, leave the drier via conduit 14 and pass to solvent recovery zone, not shown. The product, now dried to at least 99 percent solids is removed from the drier via conduit 15.

The solvent in conduit 10 is divided into two streams with sufficient solvent for dispersing solution passing via conduit 16 to surge tank 17 and the remaining solvent passing via conduit 18 to the solvent recovery zone. Solvent from surge tank 17 is then pumped via pump 19 and conduit 20 to cooler 21 wherein the temperature of the solvent is lowered to 95° F. and from whence it passes via conduit 6 to mixing zone 5, as described.

Those skilled in the art will recognize that the pressure and temperature conditions can vary over a wide range as can the flow rates so long as the solution is hot enough to maintain the polymer in solution, the diluent temperature and flow rates are regulated to result in a dispersion temperature below 170° F. and the diluent temperature is above 90° F. A gear pump is illustrated as pump 8 since this is convenient means of maintaining a suitable back pressure in zone 5, however, other back pressure means can be employed, e.g., a long conduit. Other filtering means can be employed and also other types of driers. Surge zone 17 is not essential but does help in maintaining a constant flow of recycle diluent. Those skilled in the art will see many modifications which can be made and still obtain the advantages of this invention.

EXAMPLE I

To further illustrate the advantages of controlling the diluent and dispersion temperature, the following runs were made.

Ethylene was polymerized in cyclohexane according to the method of Hogan et al. with the polymerization being carried out at a temperature of about 290° F., a pressure of approximately 400 p.s.i. with a chromium oxide-silica-alumina catalyst containing approximately 2.5 weight percent chromium. The reactor effluent was subsequently diluted with additional cyclohexane to adjust the polyethylene concentration to about 3 weight percent. Several runs were made in an apparatus having a flow essentially that as shown in the drawing. Both diluent and dispersion temperatures were varied over a wide range. The data are given in the table.

*Table I*

| Run No. | Temperature ° F. | | | Pressure, p.s.i.g. | | | Polymer in soln of feed, percent | Solid polymer in dispersion, percent | Flow GPM | | Product |
|---|---|---|---|---|---|---|---|---|---|---|---|
| | Feed | Diluent | Dispersion | Feed | Diluent | Dispersion | | | Feed | Diluent | |
| 1 | 267 | 104 | 140 | 152 | | 58 | | | 0.155 | 0.57 | Granular. |
| 2 | 273 | 103 | 138 | 152 | | 57 | | | 0.155 | 0.46 | Do. |
| 3 | 276 | 75 | 150 | 120 | 90 | 80 | 3.06 | 1.15 | 1.29 | 2.59 | Slime. |
| 4 | 280 | 70 | 175 | 100 | 110 | 90 | 3.06 | 1.79 | 1.10 | 0.70 | Slime and stringy. |
| 5 | 274 | 95 | 170 | 110 | 90 | 75 | 2.89 | 1.43 | 1.05 | 1.02 | Some stringy. |
| 6 | 276 | 95 | 145 | 86 | 90 | 80 | 3.11 | 1.31 | 1.2 | 1.3 | Granular. |
| 7 | 276 | 95 | 150 | 100 | 90 | 80 | | | 1.09 | 1.15 | Do. |

From the table it can be seen that both the diluent and dispersion temperature must be controlled. For example in run 3 the dispersion temperature was well within the operating range, however, the diluent temperature was only 75° F. The product contained a large amount of slime and the material could not be filtered within a reasonable time. In run 4, both the diluent and dispersion temperatures were out of the operative limits and this material could not be filtered. In run 5, the diluent temperature was within the operative limits and the dispersion temperature was right at the upper limit. While this material did filter and could be dried, it produced some stringy material and filtered slower than did the remaining runs and was slower drying. Runs 1, 2, 6 and 7 were all within the operable ranges and the granular product filtered readily and could be readily dried.

EXAMPLE II

A copolymer of ethylene and 1-butene is made by the method of Hogan et al. with the polymerization being carried out at a reactor temperature of 270° F., a pressure of approximately 400 p.s.i., with a chromium-oxide-silica alumina catalyst containing approximately 2.5 weight percent chromium of which approximately 2 percent is hexavalent chromium. The olefin feed comprises 15 weight percent 1-butene and 85 weight percent ethylene with the reaction occurring in a diluent comprising 70 weight percent cyclohexane and 30 weight percent normal hexane. The reaction effluent is then diluted with additional diluent to adjust the copolymer concentration to 4.1 percent. The copolymer is then separated from the diluent by the method of the present invention. The solution at 240° F. and 110 p.s.i.g. passes at the flow rate of 1.3 gallons per minute into a dispersion zone. A mixture of 70 percent cyclohexane and 30 percent n-hexane at 100° F. and 105 p.s.i.g. is pumped at a rate of 3.8 gallons per minute into said dispersion zone. The resulting dispersion comprises 1.0 percent polymer in the hydrocarbon diluent at 135° F. and 90 p.s.i.g. The polymer in said dispersion is a granular product which is readily filtered from the diluent and dried.

I claim:

1. A process for recovering a 1-olefin polymer, said polymer having been prepared from an aliphatic 1-olefin of 2 to 8 carbon atoms per molecule and having no branching nearer the double bond than the 4-position, in granular, readily filterable form from solution thereof, in a solvent selected from the group consisting of paraffins and cycloparaffins having 3 to 12 carbon atoms per molecule, said solution having a temperature at which said polymer is soluble, said process comprising introducing said solution directly into additional such solvent in liquid phase and at a temperature of at least 95° F. so as to form an admixture having a temperature in the range 130 to 170° F. thereby precipitating said polymer and thereafter separating the precipitated polymer from liquid.

2. The process of claim 1 wherein the polymer is polyethylene.

3. A process for recovering 1-olefin polymer, said polymer having been prepared from aliphatic 1-olefin of 2 to 8 carbon atoms per molecule and having no branching nearer the double bond than the 4-position, in granular readily filterable form from solution thereof in cyclohexane, said solution having a temperature at which said polymer is soluble, said process comprising introducing said solution directly into additional cyclohexane in liquid phase and at a temperature of at least 95° F. so as to form an admixture having a temperature in the range 130 to 170° F. thereby precipitating said polymer and thereafter separating the precipitated polymer from liquid.

4. The process of claim 3 wherein the volume ratio of additional cyclohexane to solution is in the range 1:1 to 5:1.

5. A process for recovering polyethylene in granular readily filterable form from solution thereof in cyclohexane, said solution having a temperature of at least 200° F., said process comprising introducing said solution directly into additional cyclohexane in liquid phase and at a temperature of at least 95° F. so as to form an admixture having a temperature in the range 130 to 170° F. thereby precipitating said polymer and thereafter separating the precipitated polymer from liquid.

References Cited in the file of this patent
UNITED STATES PATENTS 2,914,518     Cottle _____ Nov. 24, 1959